United States Patent
Caliendo, Jr. et al.

(10) Patent No.: US 9,021,383 B2
(45) Date of Patent: Apr. 28, 2015

(54) BROWSING BETWEEN MOBILE AND NON-MOBILE WEB SITES

(75) Inventors: Neal Robert Caliendo, Jr., Raleigh, NC (US); Jason Grimme, Cary, NC (US); Michael Thano Matthews, Cary, NC (US); Russell Speight VanBlon, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 544 days.

(21) Appl. No.: 13/324,993

(22) Filed: Dec. 13, 2011

(65) Prior Publication Data
US 2013/0152009 A1    Jun. 13, 2013

(51) Int. Cl.
G06F 3/0481    (2013.01)
G06F 17/30     (2006.01)
G06F 3/14      (2006.01)

(52) U.S. Cl.
CPC ............ G06F 17/30905 (2013.01); *G06F 3/14* (2013.01); *G09G 2340/14* (2013.01); *G09G 2370/027* (2013.01)

(58) Field of Classification Search
CPC ............ G06F 3/00; G06F 3/01; G06F 3/041; G06F 3/048; G06F 1/1626; G06F 3/0488; G06F 3/016; G06F 3/0481; G06F 9/44543; G06F 3/04883; H04L 29/06; H04L 29/0809
USPC ......... 715/702, 733, 738, 764, 765, 781, 863, 715/864; 345/169, 173
See application file for complete search history.

(56) References Cited

U.S. PATENT DOCUMENTS

| | | | | |
|---|---|---|---|---|
| 7,831,926 B2* | 11/2010 | Rohrabaugh et al. | ......... | 715/800 |
| 8,448,074 B2* | 5/2013 | Forutanpour et al. | ......... | 715/760 |
| 2005/0216846 A1* | 9/2005 | Kalenius | ........................ | 715/747 |
| 2006/0113957 A1* | 6/2006 | Ito et al. | ........................ | 320/114 |
| 2007/0061486 A1* | 3/2007 | Trinh et al. | .................... | 709/246 |
| 2009/0210514 A1* | 8/2009 | Davis et al. | .................... | 709/219 |
| 2010/0077321 A1* | 3/2010 | Shen et al. | ..................... | 715/760 |
| 2010/0274870 A1* | 10/2010 | Cremin et al. | ................. | 709/217 |
| 2011/0216064 A1* | 9/2011 | Dahl et al. | ..................... | 345/428 |
| 2011/0254792 A1* | 10/2011 | Waters et al. | ................. | 345/173 |
| 2012/0060087 A1* | 3/2012 | Jame et al. | ..................... | 715/238 |
| 2012/0066619 A1* | 3/2012 | Lee | ................................ | 715/760 |
| 2012/0131441 A1* | 5/2012 | Jitkoff et al. | ................... | 715/234 |
| 2013/0145448 A1* | 6/2013 | Newell | ............................... | 726/7 |

FOREIGN PATENT DOCUMENTS

KR    101079624 B1 * 11/2011

OTHER PUBLICATIONS

Opera Software: Faster surfing on Windows Mobile: The Opera browser now available for Pocket PC; M2 Presswire: 1. Coventry: Normans Media Ltd.; May 31, 2006.*

* cited by examiner

*Primary Examiner* — Xiomar L Bautista
(74) *Attorney, Agent, or Firm* — John L. Rogitz; John M. Rogitz

(57) ABSTRACT

According to one disclosed embodiment, an approach is provided in which a mobile mode of a Website is displayed in a first (smaller) window displayed on a display screen with the mobile mode corresponding to a first (mobile) network address of the Website. A user action is received that requests a non-mobile mode of the Website. The user action is processed by closing the first (smaller) window and displaying a non-mobile (e.g., desktop) mode of the Website in a second window, such as a browser, that is displayed on the display screen. The non-mobile mode of the Website corresponds to a second network address (e.g., a normal, or desktop, version of the Website).

20 Claims, 7 Drawing Sheets

BROWSING BETWEEN MOBILE AND NON-MOBILE WEB SITES

BACKGROUND

The present invention relates to an approach that provides interfaces for both mobile and non-mobile Web sites provided by an online entity.

A full screen browser is not always necessary when viewing a Web site when only a subset of site-provided tasks are needed or used by the user. This makes navigating the desired tasks on a Web site more difficult as extra information is displayed above an beyond what is needed by the user. In addition, a mobile web site sometimes does not contain all functions desired by the user when the full Web site is desired. One approach is for the user to manually enter a mobile URL in order to view the mobile site and to enter the non-mobile URL when the full Web site is desired. However, this can be cumbersome and time-consuming as the user would be required to know both URLs.

BRIEF SUMMARY

According to one disclosed embodiment, an approach is provided in which a mobile mode of a Website is displayed in a first (smaller) window displayed on a display screen with the mobile mode corresponding to a first (mobile) network address of the Website. A user action is received that requests a non-mobile mode of the Website. The user action is processed by closing the first (smaller) window and displaying a non-mobile (e.g., desktop) mode of the Website in a second window, such as a browser, that is displayed on the display screen. The non-mobile mode of the Website corresponds to a second network address (e.g., a normal, or desktop, version of the Website).

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
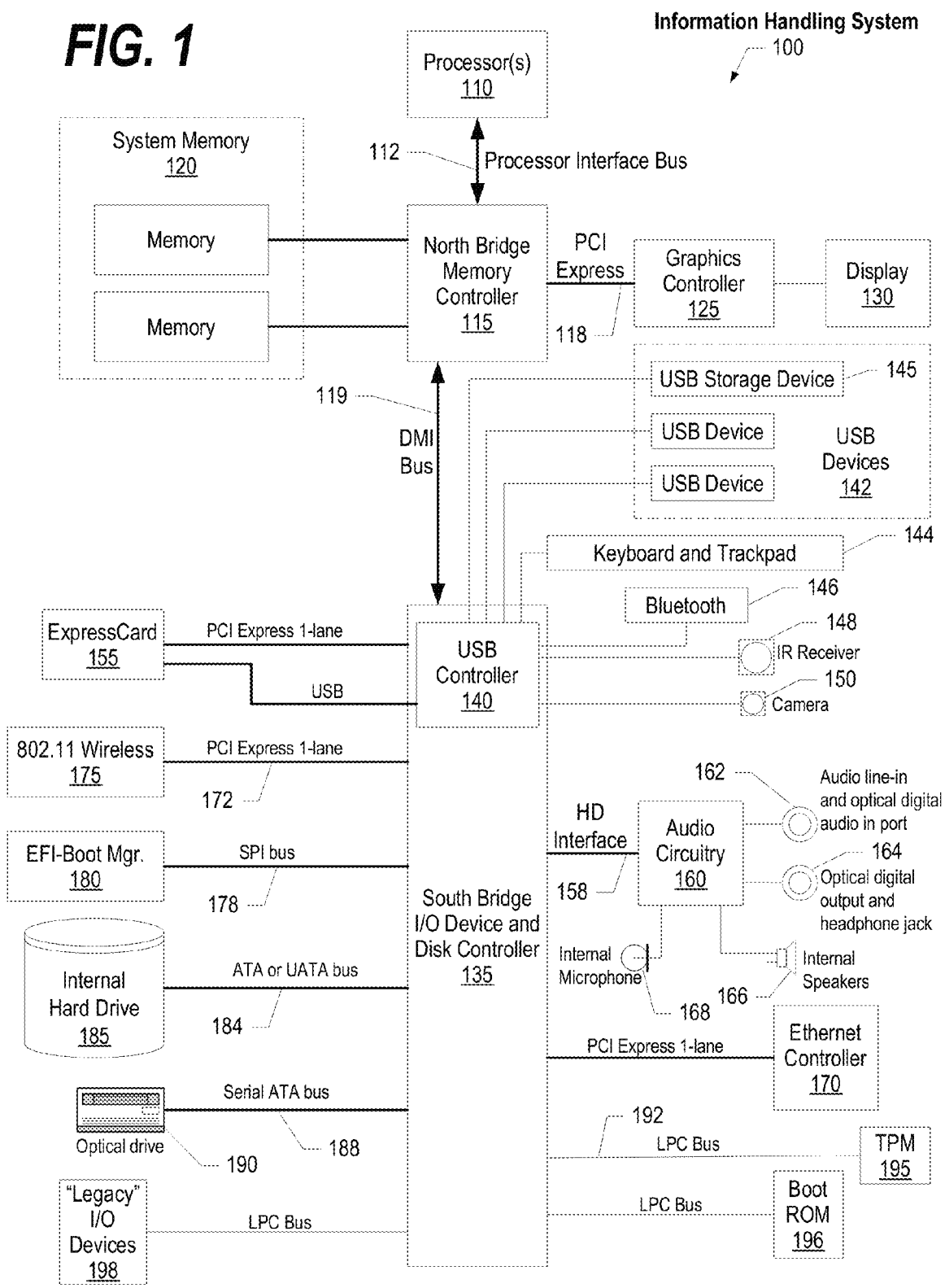
FIG. 1 is a block diagram of a data processing system in which the methods described herein can be implemented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The detailed description has been presented for purposes of illustration, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary, as set forth above, further explaining and expanding the definitions of the various aspects and embodiments as necessary. To this end, this detailed description first sets forth a computing environment in FIG. 1 that is suitable to implement the software and/or hardware techniques associated with the disclosure. A networked environment is illustrated in FIG. 2 as an extension of the basic computing environment, to emphasize that modern computing techniques can be performed across multiple discrete devices.

Figure 2:
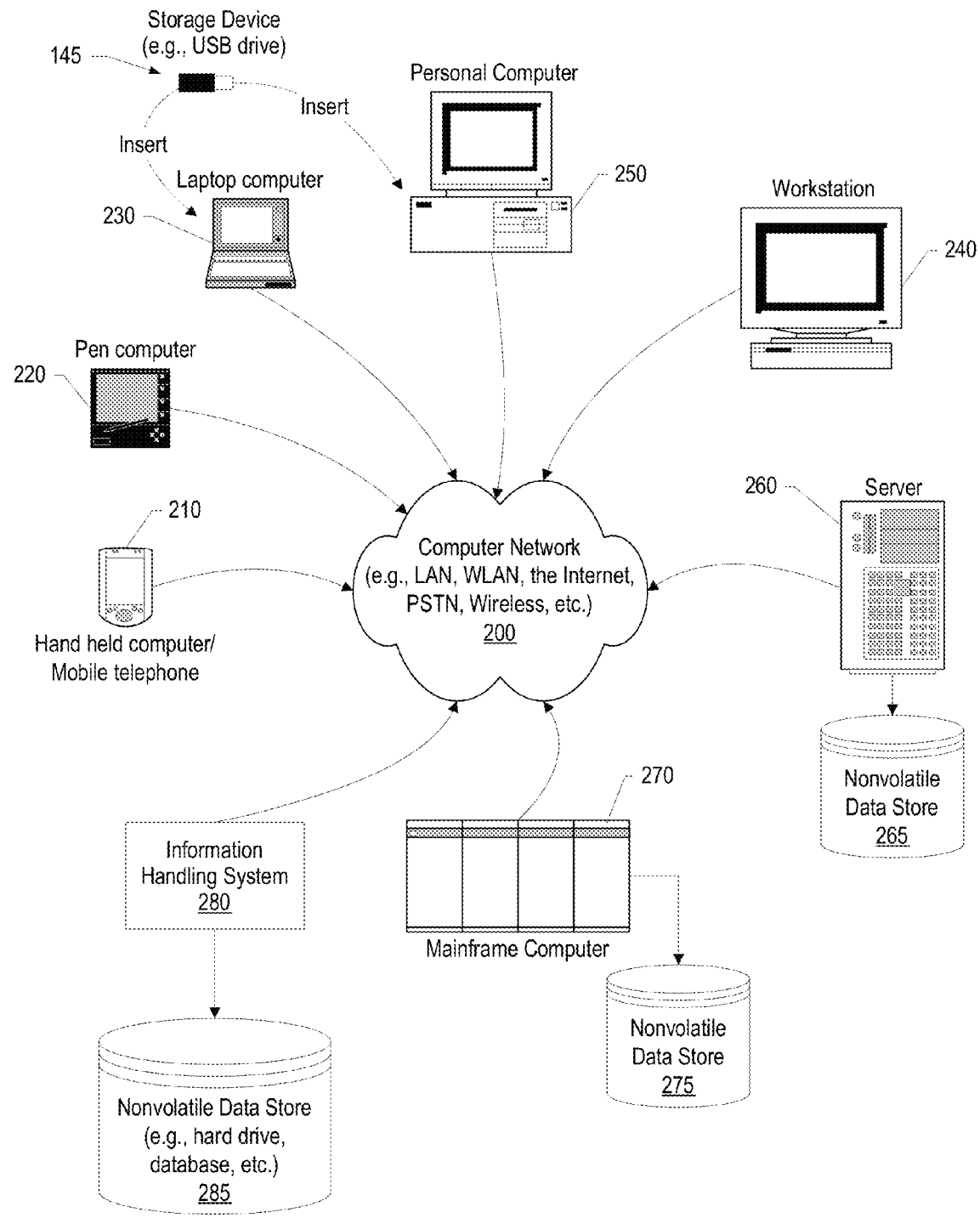
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
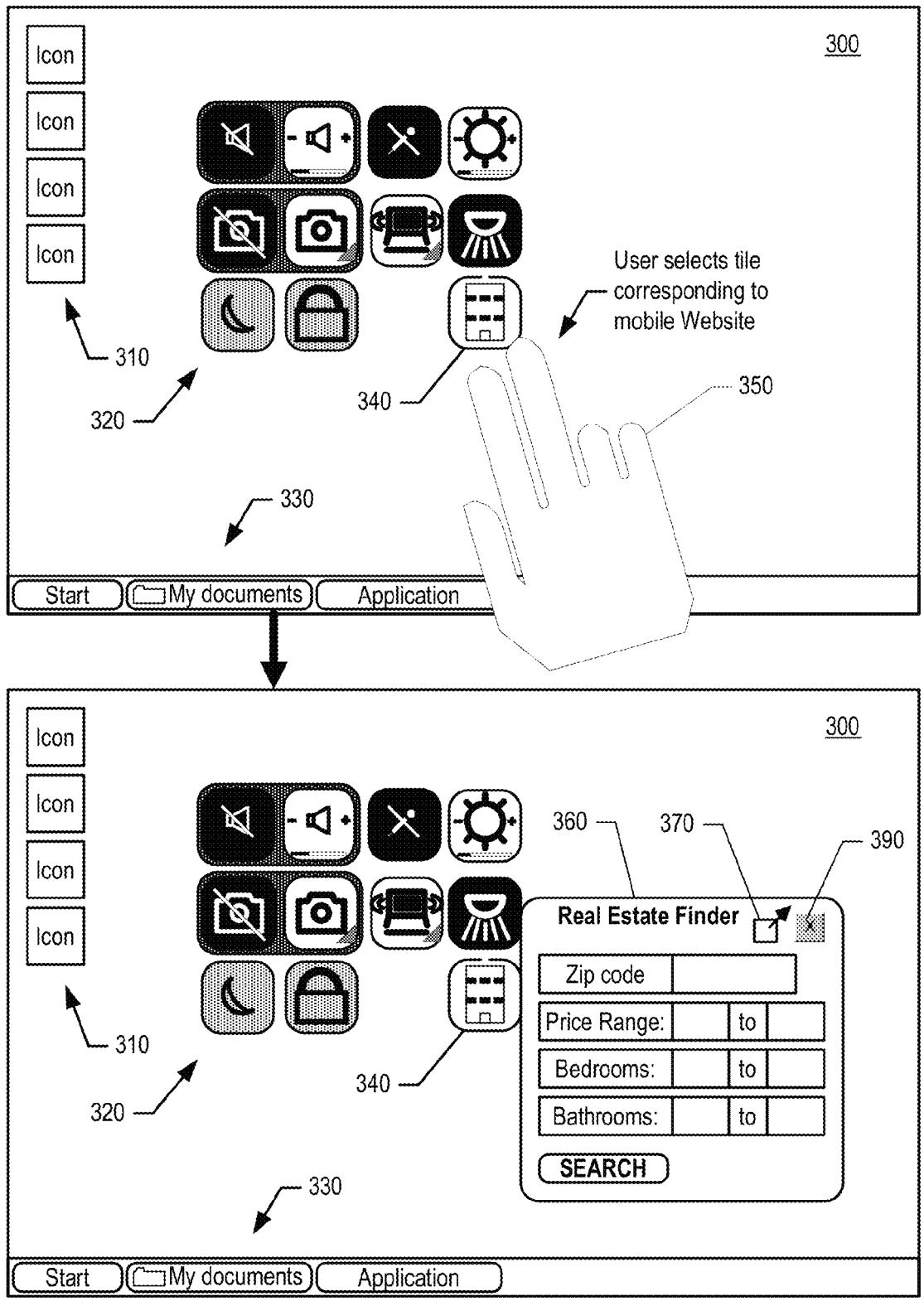
FIG. 3 is a pair of screen diagrams showing a user requesting a mobile Website of an online provider.

FIG. 3 depicts a pair of screen diagrams showing a user requesting a mobile Website of an online provider. FIG. 3 shows a user requesting a Website corresponding to a tile using a particular gesture or other selection (e.g., mouse click, etc.) in which the tile is a graphical user interface (GUI) appearing on a display screen. The information handling system is shown with a plurality of graphical user interface (GUI) controls, such as tiles 320 and icons 310, displayed on display screen 300. Title bar 330 is also displayed at the bottom of the display. One of the GUI controls (GUI control 340) is currently being selected by user 350 using a hand gesture on a touch-enabled display screen. In another embodiment, selected GUI control 340 is selected by the user using a mouse or other selection device. The tile being selected by the user corresponds to a real estate Website.

The bottom part of FIG. 3 shows a mobile mode of the real estate Website 360 that is displayed in response to the user action. In one embodiment, the mobile mode is displayed in a billboard window (360). Mobile mode window 360 includes enlarge control 370 and close control 390, among other controls. Mobile mode 360 receives its content from the mobile network address of the website (e.g., m.[websitename].com which would correspond to a non-mobile Website of www.[websitename].com, etc.). When enlarge control 370 is selected by the user, the mobile mode window (360) is closed and a new, larger window (see FIG. 4 for an example) is displayed with content of the non-mobile (e.g., desktop, etc.) version of the Website received and displayed in the new window (e.g., content received from www.[websitename].com instead of from the mobile version of the Website m.[websitename].com, etc.). Close control 390 is selected by the user to close window 360 when the user is finished viewing. Selecting close window control 390 removes the billboard window from the display with the resulting display being like the top half of FIG. 3.

Figure 4:
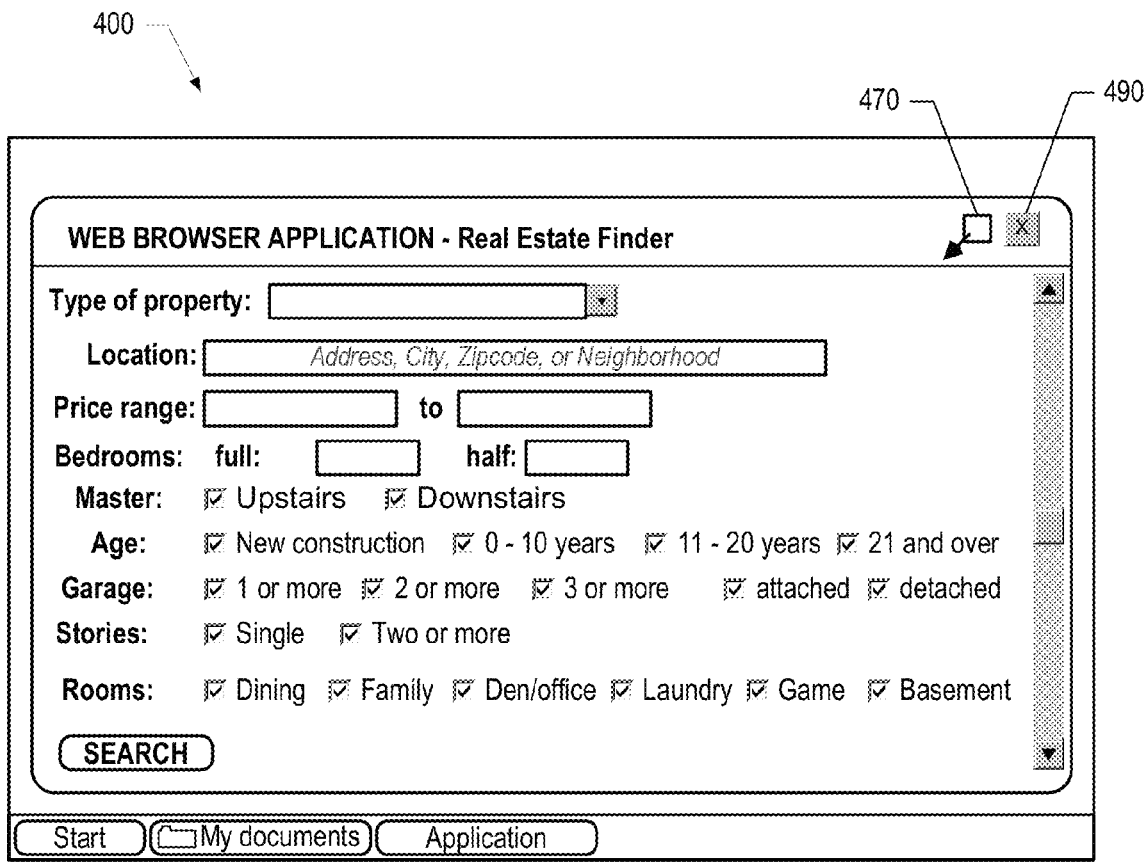
FIG. 4 is a screen diagram showing the result of the user requesting the full Website from an interface provided on the mobile display of the Website from FIG. 3.

FIG. 4 is a screen diagram showing the result of the user requesting the full Website (non-mobile mode) from an interface provided on the mobile display of the Website from FIG. 3. One example of Window 400 is the window provided in a standard desktop browser application. Display 400 results when the user selected the "enlarge" control (370) from FIG. 3. While the mobile mode of the Website (see window 360 in FIG. 3) provided less information and would be more suitable to display on a mobile device or in a small window such as shown in FIG. 3, the non-mobile mode of the Website shown here in FIG. 4 provides more information and is suitable for display on a larger (e.g., non-mobile, etc.) display screen. Non-mobile mode window 400 includes "reduce" control 470 which, when selected by the user, results in the mobile mode of the Website being redisplayed as shown in FIG. 3. As previously described in reference to FIG. 3, non-mobile mode window 400 receives content from a non-mobile address of the Website, while the mobile mode (shown in FIG. 3) receives content from a mobile address of the Website. Close control 490 is selected by the user to close window 400 when the user is finished viewing. Selecting close window control 400 removes the non-mobile window from the display with the resulting display being like the top half of FIG. 3.

Figure 5:
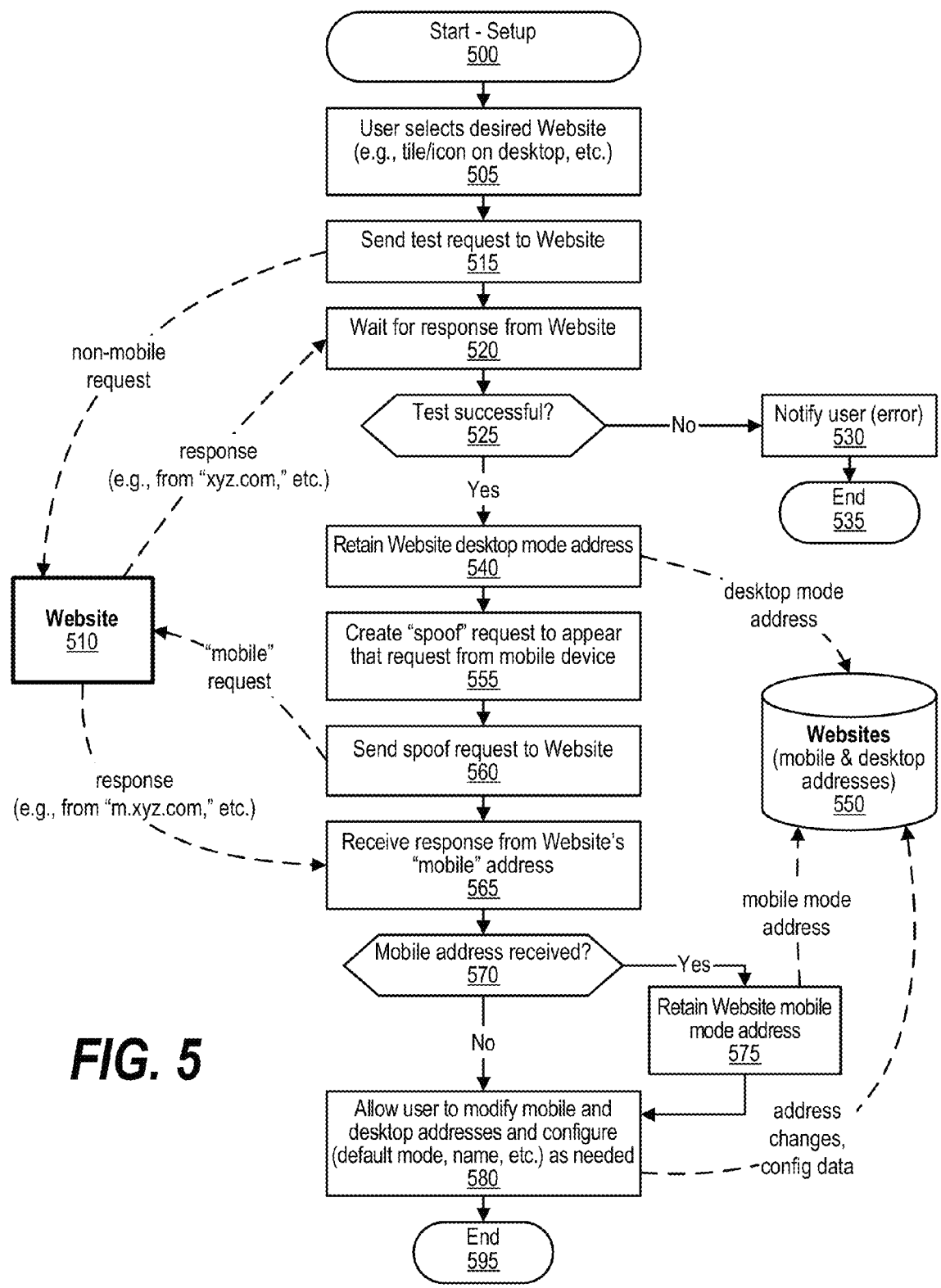
FIG. 5 is a flowchart showing the steps performed to setup the display of mobile and non-mobile Websites on the user's system.

FIG. 5 is a flowchart showing the steps performed to setup the display of mobile and non-mobile Websites on the user's system. Processing commences at 500 whereupon, at step 505, the user selects a Website (e.g., by browsing using a browser application, etc.) and requests that the Website be stored as a graphical control (e.g., tile, icon, etc.) on the user's system. At step 515, a test request is sent to Website 510 that is being requested by the user. At step 520, the system receives a response from the website. A decision is made as to whether the test was successful (decision 525). If the test was unsuccessful (e.g., a website was not contacted, etc.) then decision 525 branches to the "no" branch whereupon, at step 530 the user is notified of the error and processing ends at 535.

On the other hand, if the test request was successful, then decision 525 branches to the "yes" branch for further processing. At step 540, the Website's non-mobile address is retained in website data store 550. At step 555, the system creates a "spoof" test request that appears as though the system is a mobile, rather than a non-mobile, device. At step 560, the spoof test request is sent to the website indicating a mobile request. At step 565, the mobile network address is received from Website 510. A decision is made as to whether a mobile address different from the non-mobile address was received from the website (decision 570). If a mobile address was received, then decision 570 branches to the "yes" branch whereupon, at step 575, the Website's mobile address is stored in website data store 550 and is associated with the non-mobile website. On the other hand, if a mobile address was not received from the website, then decision 570 branches to the "no" branch bypassing step 575. At step 580, the user is allowed to modify either (or both) the mobile and non-mobile addresses as well as configure the default launch mode (e.g., small mobile mode, larger non-mobile mode, etc.) that should be used when the user requests this website. As shown in FIGS. 3 and 4, the user can switch back and forth between the mobile and non-mobile modes as desired. Setup processing thereafter ends at 595.

Figure 6:
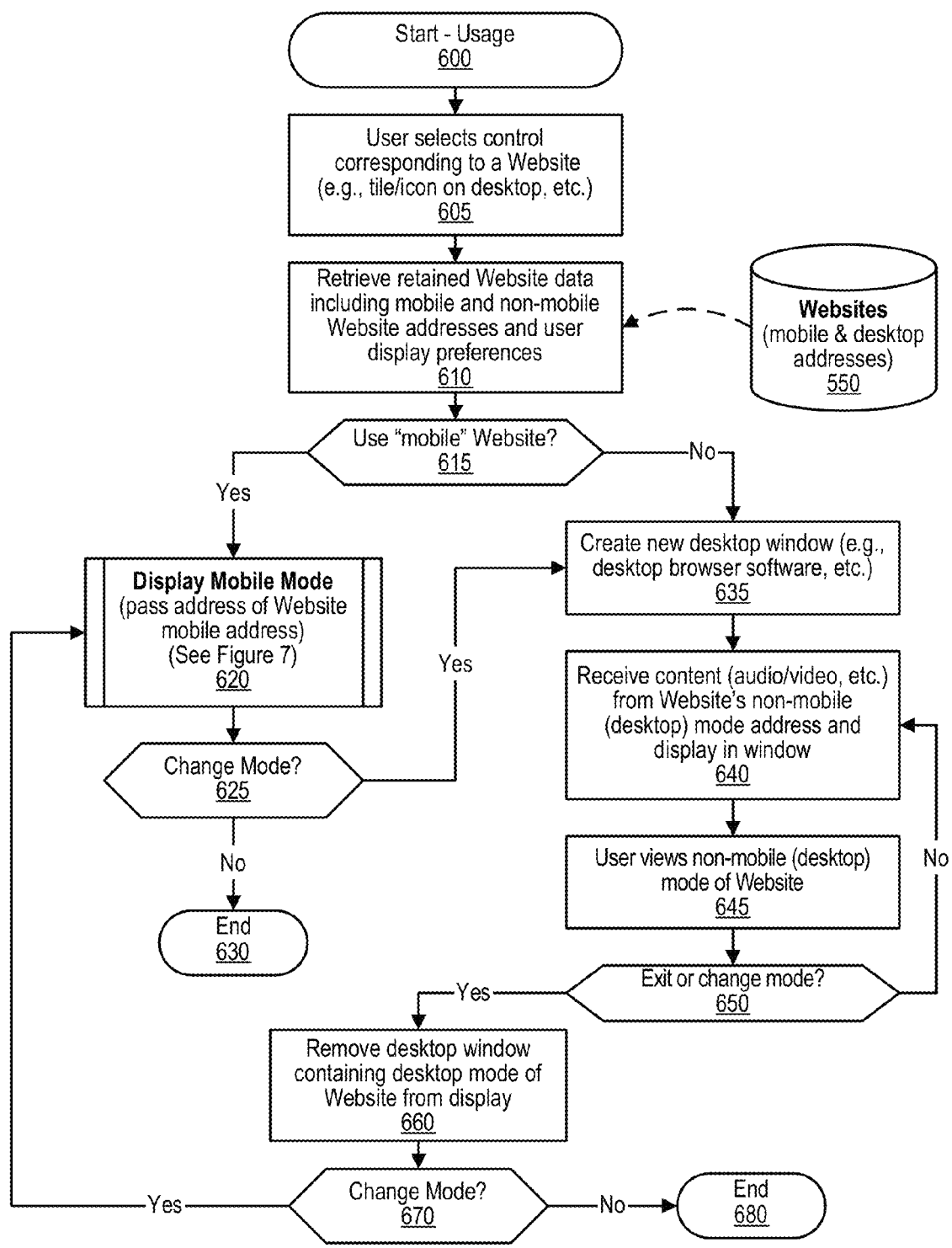
FIG. 6 is a flowchart showing the steps performed when the user is using the functions provided by the display of the mobile and non-mobile Websites.

FIG. 6 is a flowchart showing the steps performed when the user is using the functions provided by the display of the mobile and non-mobile Websites. Processing commences at 600 whereupon, at step 605, the user selects a control that corresponds to a website. At step 610, the previously retained website data (addresses, default launch mode, etc.) is retrieved from websites data store 550.

A decision is made as to whether the user has requested to view the mobile mode of the Website (decision 615). If the user has requested to view the mobile mode of the website, then decision 615 branches to the "yes" branch whereupon, at predefined process 620, the mobile mode of the website is displayed (see, e.g., window 360 in FIG. 3). See FIG. 7 and corresponding text for processing details regarding the display of the mobile mode of the website. When the user is finished viewing the mobile mode of the website, a decision is made as to whether the user has requested to view the non-mobile mode of the website or has requested to close the window (decision 625). If the user has not requested to change the mode (and has instead requested to close the window), then decision 625 branches to the "no" branch whereupon processing ends at 630. On the other hand, if the user has requested to change the mode to the non-mobile (e.g., desktop mode, etc.) then decision 625 branches to the "yes" branch for further processing. In addition, returning to decision 615, the non-mobile mode processing is performed if either the default launch mode is to the non-mobile mode (decision 615 branching to the "yes" branch) or if the user was viewing the mobile mode and has requested to change modes to the non-mobile mode (decision 625 branching to the "yes" branch).

Non-mobile mode processing is performed by the following steps. First, at step 635, a new non-mobile (desktop) window is created, such as a traditional browser software application, that is larger than the mobile mode window. Next, at step 640, content is received from the non-mobile (desktop) address corresponding to the website and this content is displayed in the newly created desktop (non-mobile) window. At step 645, the user views and works with the content displayed in the non-mobile window. A decision is made as to whether the user has requested to exit (close) the application or has requested to change mode back to the mobile mode of the website (decision 650). If the user has not requested to change the mode back to the mobile mode and has not requested to close the desktop window, then the desktop window continues to be displayed and content continues to be received from the non-mobile mode of the website with processing looping back to steps 640 and 645. This looping continues until the user requests to either close (exit) the window or has requested to change modes back to the mobile mode of the website, at which time decision 650 branches to the "yes" branch for further processing.

At step 660, the desktop window displaying the non-mobile mode of the website is removed from the display. A decision is made as to whether the user requested to change modes back to the mobile mode of the website or has requested to close (exit) the window (decision 670). If the user has requested to change the mode back to the mobile mode of the website, then decision 670 branches to the "yes" branch whereupon processing branches to predefined process 620 to display the mobile mode of the website (see FIG. 7 and corresponding text for processing details). On the other hand, if the user has requested to close (exit) the window, then decision 670 branches to the "no" branch whereupon processing ends at 680.

Figure 7:
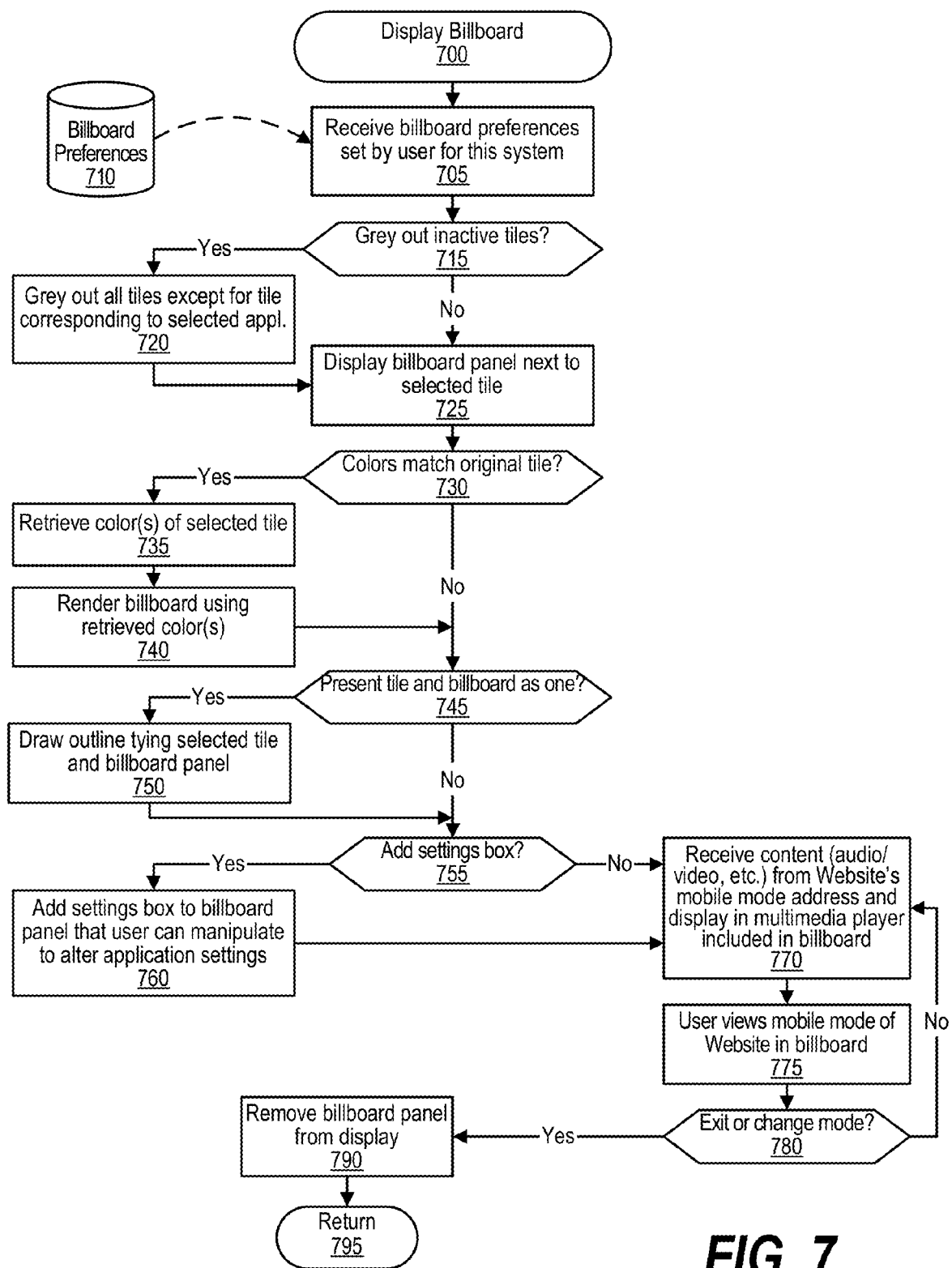
FIG. 7 is a flowchart showing the steps performed to display the mobile Website inside of a billboard interface displayed on the user's display screen.

FIG. 7 is a flowchart showing the steps performed to display a billboard container that displays the mobile Website requested by the user in FIG. 6. Display billboard processing commences at 700 whereupon, at step 705, the user's billboard preferences (or default preferences if not set by the user) are retrieved from billboard preferences data store 710.

A decision is made, based on the retrieved preferences as to whether to visually inactivate the non-selected GUI controls displayed on the display screen (decision 715). If non-selected GUI controls are to be visually inactivated, then decision 715 branches to the "yes" branch whereupon, at step 720 all GUI controls displayed on the display screen are shown as inactivated (e.g., grayed out, etc.). Visually inactivating the non-selected GUI controls is performed by rendering the non-selected GUI controls in a muted color palate. The selected GUI control is displayed as visually activated by rendering the selected GUI control in an active color palate. The billboard data is displayed in a billboard window on the display screen with the billboard window also being rendered in the active color palate.

A decision is made, based on the retrieved preferences as to whether to use the same colors to render the billboard window as were used to render the selected GUI control (decision 730). If the preference is to render the billboard window in the same colors as the selected GUI control, then decision 730 branches to the "yes" branch whereupon, at step 735, the colors used to render the selected GUI control are retrieved and, at step 740, the billboard data is displayed in a billboard window on the display screen rendered using the colors that were retrieved from the selected GUI control.

A decision is made, based on the retrieved preferences as to whether to visually present the selected GUI control and the billboard window with an outline that ties the selected GUI control and the billboard window together (decision 745). If the preference is to visually present the selected GUI control and the billboard window with an outline that ties the selected GUI control and the billboard window together, then decision 745 branches to the "yes" branch whereupon, at step 750, a billboard window is displayed adjacent to the selected GUI control with the billboard window used to display the billboard data and a visual outline is displayed around both the selected GUI control and the billboard window to visually tie the selected GUI control and the billboard window as a single visible panel.

A decision is made, based on the retrieved preferences as to whether to include a settings GUI control in the billboard window that allows the user to select in order to display a dialog with the software application's configuration settings (decision 755). If the preference is to include a settings box, then decision 755 branches to the "yes" branch whereupon, at step 760, a settings box is added to the billboard panel. The settings box allows the user to manipulate application settings. On the other hand, if the preference is to not include a settings box, then decision 755 branches to the "no" branch bypassing step 760.

At step 770, multimedia content (audio, text, video, etc.) is received from the Website's mobile mode address and this received data is displayed in the multimedia player that is included in the displayed billboard container. At step 775, the user interfaces with the mobile mode of the Website in the displayed billboard container. A decision is made as to whether the user has decided to exit or change the mode of the Website display (decision 780). If the user has not exited or requested to change the mode, then decision 780 branches to the "no" branch which loops back to continue accessing the mobile mode address of the Website and the user continues to access the Website from the mobile mode which is displayed in the billboard container. This looping continues until the user decides to exit or change the viewing mode, at which point decision 780 branches to the "yes" branch whereupon, at step 790, the billboard container window is removed from the display screen and processing returns to the calling routine (see FIG. 6) at 795.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method comprising:

in response to detection of a first selection of a first selector element presented on a display screen, displaying a mobile mode of a website on the display screen, the mobile mode associated with a first network address, the first network address not being received based on user input received subsequent to the detection of the first selection of the first selector element;

receiving a first user action requesting a non-mobile mode of the website based at least in part on detection of a second selection of a second selector element presented in the mobile mode of the website:

in response to receiving the first user action, displaying a non-mobile mode of the website on the display screen, wherein the non-mobile mode is associated with a second network address.

2. The method of claim 1, wherein the first and second network addresses are respectively retrieved from a data store responsive to first and second respective selections of the first and second selector elements, the method further comprising, prior to detection of the first selection of the first selector element:

receiving a request to establish the mobile mode as a default mode for display of the website responsive to selection of the first selector element;

in response to receipt of the request to establish the mobile mode as the default mode, establishing the mobile mode as the default mode; and retaining the second network address in the data store and retaining the first network address in the data store.

3. The method of claim 1, wherein the method comprises:

in response to receipt of the first user action, retrieving the second network address from a data store, wherein the second network address is associated with the first network address in the data store;

sending a request addressed to the second network address of the website; and receiving content in response to the request, wherein the received content is displayed using the non-mobile mode of the website.

4. The method of claim 1, comprising:

displaying the mobile mode of the website in a first window;

in response to receipt of the first user action, closing the first window and displaying the non-mobile mode of the website in a second window displayed on the display screen;

receiving a second user action based at least in part on detection of a third selection of a third selector element presented on the non-mobile mode in the second window; and in response to receiving the user action, closing the second window and displaying the mobile mode of the website in the first window.

5. The method of claim 4, wherein the processing in response to the second user action comprises:

retrieving the first network address from a data store that comprises a plurality of network addresses, wherein the first network address is associated with the second network address in the data store;

sending a request addressed to the first network address of the website; and receiving content in response to the request, wherein the received content is adapted for display on a mobile device, wherein the received content is displayed as at least part of the mobile mode of the website in the first window.

6. The method of claim 4, wherein the first window displays multimedia content, and wherein the second window is associated with a browser software application.

7. The method of claim 1, wherein the mobile mode is displayed using a first application, and wherein the non-mobile mode is displayed using an Internet browser application different from the first application.

8. The method of claim 1, wherein the first selector element is selected from the group consisting of: an icon presented on the display screen, a tile presented on the display screen.

9. An information handling system comprising;
one or more processors;
a memory accessible to at least one of the processors;
a display screen accessible by at least one of the processors; and
instructions stored in the memory which are executable by at least one of the processors to:
in response to identification of a first selection of a first selector element presented on the display screen, display a mobile version of a website on the display screen without further user input subsequent to identification of the first selection providing an address for the mobile version of the website:
receive a first user action identified as a request to display a non-mobile version of the website based at least in part on identification of a second selection of a second selector element presented on the mobile version of the website; and
in response to receipt of the first user action, display a non-mobile version of the website on the display screen.

10. The information handling system of claim 9, wherein the instructions are further executable to:
display on the display screen the mobile version of the website in a first window;
in response to receipt of the first user action, close the first window and display on the display screen the non-mobile version of the website in a second window;
receive a second user action at the second window, wherein the second user action is identified as a third selection of a third selector element presented on the second window; and
in response to receipt of the second user action, close the second window and display on the display screen the mobile version of the website in the first window.

11. The information handling system of claim 9, wherein the instructions are further executable, prior to identification of the first selection of the selector element, to:
receive a request to establish the mobile version as a default version for display of the website responsive to selection of the first selector element; and
in response to receipt of the request to establish the mobile version as the default version, establish the mobile version as the default version.

12. The information handling system of claim 9, wherein a first network address is associated with the mobile version, wherein a second network address is associated With the non-mobile version, and wherein the instructions are executable, responsive to receipt of the first user action, to;
retrieve the second network address from a data store;
transmit a request addressed to the second network address of the website; and
receive content in response to the request, wherein the received content is displayed as at least part of the non-mobile version of the website.

13. The information handling system of claim 9, wherein the mobile version is displayed using a first application stored at the information handling system, and wherein the non-mobile version is displayed using a browser application different from the first application.

14. The information handling system of claim 9, wherein the first selector element is selected from the group consisting of: an icon presented on the display screen, a tile presented on the display screen.

15. A computer readable storage medium that is not a transitory signal, the computer readable storage medium comprising instructions executable by a processor of an information handling system to:
in response to identification of a first selection of a first selector element presented on a display, display a mobile version of a website on the display without further user input subsequent to identification of the first selection which provides an address for the mobile version of the website;
receive first user input identified as a second selection of a second selector element presented on the mobile version; and
in response, to receipt of the first user input, display a non-mobile version of the website on the display.

16. The computer readable storage medium of claim 15, wherein the instructions are further executable to:
display on the display the mobile version of the website in a first window;
in response to receipt of the first user input, close the first window and display on the display the non-mobile version of the website in a second window;
receive second user input identified as a third selection of a third selector element presented on the non-mobile version in the second window; and
in response to receipt of the second user input, close the second window and display on the display the mobile version of the website in the first window.

17. The computer readable storage medium of claim 15, wherein a first network address associated with the mobile version and a second network address associated with the non-mobile version are retrieved from a data store, and wherein the instructions are further executable, prior to identification of the first selection of the first selector element, to:
receive input to establish the mobile version as a default version to be displayed responsive to selection of the first selector element; and
in response to receipt of the input to establish the mobile version as the default version, establish the mobile version as the default version.

18. The computer readable storage medium of claim 15, wherein a first network address is associated with the mobile version, wherein a second network address is associated with the non-mobile version, and wherein the instructions are executable, responsive to receipt of first user input, to;
retrieve the second network address from a data store;
transmits a request to the second network address of the website; and
receive content in response to the request, wherein the received content is displayed as at least part of the non-mobile version of the website.

19. The computer readable storage medium of claim 15, wherein the mobile version is displayed using a first application stored at the information handling system, and wherein the non-mobile version is displayed using a browser application different from the first application.

20. The computer readable storage medium of claim 15, wherein the first selector element is selected from the group consisting of: an icon presented on the display, a tile presented on the display.

* * * * *